United States Patent
Wang et al.

(10) Patent No.: US 10,491,423 B2
(45) Date of Patent: Nov. 26, 2019

(54) VLAN TAG COMMUNICATION METHOD BY USING A REMOTE NETWORK ELEMENT PORT AND APPARATUS

(71) Applicant: HUAWEI TECHNOLOGIES CO., LTD., Shenzhen, Guangdong (CN)

(72) Inventors: Dayong Wang, Chengdu (CN); Xi Liu, Shenzhen (CN); Bo Liang, Chengdu (CN)

(73) Assignee: Huawei Technologies Co., LTD., Shenzhen (CN)

(*) Notice: Subject to any disclaimer, the term of this patent is extended or adjusted under 35 U.S.C. 154(b) by 6 days.

(21) Appl. No.: 15/854,368

(22) Filed: Dec. 26, 2017

(65) Prior Publication Data
US 2018/0123826 A1 May 3, 2018

Related U.S. Application Data

(63) Continuation of application No. PCT/CN2015/082832, filed on Jun. 30, 2015.

(51) Int. Cl.
*H04L 12/28* (2006.01)
*H04L 12/46* (2006.01)
(Continued)

(52) U.S. Cl.
CPC ............ *H04L 12/465* (2013.01); *H04L 45/64* (2013.01); *H04L 49/354* (2013.01);
(Continued)

(58) Field of Classification Search
CPC ..... H04L 12/465; H04L 45/64; H04L 49/354; H04L 45/50; H04L 49/70
See application file for complete search history.

(56) References Cited

U.S. PATENT DOCUMENTS

2004/0252722 A1* 12/2004 Wybenga ............ H04L 12/4645
370/474
2005/0163102 A1* 7/2005 Higashitaniguchi ........................
H04L 12/4666
370/351
(Continued)

FOREIGN PATENT DOCUMENTS

CN 101491029 A 7/2009
CN 101567854 A 10/2009
(Continued)

OTHER PUBLICATIONS

Anonymous: "SDN Architecture". Open networking foundation, Jun. 30, 2014, ONF TR-502, XP055475648. 68 pages.
(Continued)

*Primary Examiner* — Abdelnabi O Musa
(74) *Attorney, Agent, or Firm* — Fish & Richardson P.C.

(57) ABSTRACT

The present disclosure provides a method for communicating by using a remote network element port, and an apparatus, and the method is applied to a virtual network element. The virtual network element includes a master node and an egress AP, and the master node adds a first layer VLAN tag to a virtualization packet according to a virtual port corresponding to the virtualization packet to allow the egress AP to distinguish between the virtualization packet and a non-virtualization packet according to the first layer VLAN tag, and, based on the distinguishing, the virtualization packet is correctly processed.

20 Claims, 7 Drawing Sheets

(51) Int. Cl.
  *H04L 12/931* (2013.01)
  *H04L 29/06* (2006.01)
  *H04L 12/715* (2013.01)
  *H04L 12/723* (2013.01)
  *H04L 12/713* (2013.01)

(52) U.S. Cl.
  CPC .......... *H04L 63/0272* (2013.01); *H04L 45/50* (2013.01); *H04L 45/586* (2013.01); *H04L 49/70* (2013.01)

(56) References Cited

U.S. PATENT DOCUMENTS

| | | |
|---|---|---|
| 2008/0013547 A1 | 1/2008 | Klessig et al. |
| 2009/0154471 A1* | 6/2009 | Kim .................. H04L 12/2856 370/395.53 |
| 2011/0142045 A1* | 6/2011 | Ait-Ameur ......... H04L 12/4641 370/392 |
| 2012/0113989 A1 | 5/2012 | Akiyoshi et al. |
| 2012/0213226 A1* | 8/2012 | Patel ..................... H04L 45/60 370/392 |
| 2012/0287936 A1* | 11/2012 | Biswas ............... H04L 12/4641 370/395.3 |
| 2015/0043589 A1 | 2/2015 | Han et al. |

FOREIGN PATENT DOCUMENTS

| | | |
|---|---|---|
| CN | 102934400 A | 2/2013 |
| CN | 103404084 A | 11/2013 |
| CN | 103475559 A | 12/2013 |
| CN | 103763146 A | 4/2014 |
| CN | 104518935 A | 4/2015 |

OTHER PUBLICATIONS

Extended European Search Report issued in European Application No. 15896752.1 dated May 24, 2018, 10 pages.
International Search Report and Written Opinion in International Application No. PCT/CN2015/082832, dated Mar. 24, 2016, 17 pages.
Chinese Office Action issued in Chinese Application No. 201580055318.2 dated Mar. 22, 2019, 5 pages.

* cited by examiner

VLAN TAG COMMUNICATION METHOD BY USING A REMOTE NETWORK ELEMENT PORT AND APPARATUS

CROSS-REFERENCE TO RELATED APPLICATIONS

This application is a continuation of International Application No. PCT/CN2015/082832, filed on Jun. 30, 2015. The disclosures of the aforementioned application is hereby incorporated by reference in its entireties.

TECHNICAL FIELD

Embodiments of the present disclosure relate to communications technologies, and in particular, to a method for communicating by using a remote network element port, and an apparatus.

BACKGROUND

A microwave network virtualization technology is implemented based on a Software Defined Network (SDN) solution, and with reference to some of a Network Function Virtualization (NFV) technology: Chain network nodes or ring network nodes are simplified as a multiport virtual network element, so as to shrink a network scale and simplify network operation and maintenance. For example, a chain network includes a master (Master) node and multiple Access Point (AP). Before virtualization is performed, the master node and the multiple APs are independent devices. A user side needs to obtain connections between the master node and the multiple APs and information about the master node and the multiple APs. After the master node and the multiple APs are virtualized as a virtual network element, the user side considers the master node and the multiple APs as one network element. From a perspective of the user side, the network scale is reduced, and the user side needs to obtain information about only one virtual network element, so that network operation and maintenance are simplified.

There are two types of services running in the virtual network element: a virtualization service and a non-virtualization service. From a perspective of the user side, there is no difference between a virtualization packet and a non-virtualization packet. However, in the virtual network element, because the two types of services are processed in different manners, the two types of services need to be distinguished. The virtualization packet is a data unit that is used to exchange and transmit the virtualization service in a network, and the non-virtualization packet is a data unit that is used to exchange and transmit the non-virtualization service in the network. The virtualization service is transmitted in the virtual network element, and this may be implemented in the following two manners: (1) Multi-Protocol Label Switching (MPLS) forwarding: a direction from the AP to the Master node is used as an example, and an ingress AP encapsulates a one-layer MPLS label at an outer layer of the virtualization packet after the virtualization packet enters the virtual network element. The ingress AP is the first AP that receives the virtualization packet in the virtual network element. Then, an intermediate AP in the multiple APs forwards the service according to the outer-layer MPLS label, and finally the virtualization packet is sent to the master node. The master node removes the outer-layer MPLS label, and processes the service according to an inner-layer MPLS label of the virtualization packet. (2) QinQ forwarding: a difference between QinQ forwarding and MPLS forwarding is that forwarding is performed by using a two-layer VLAN tag in QinQ forwarding.

A Distributed Switching Architecture (DSA) technology is used in the virtual network element, connection and communication between the master node and the multiple APs are performed in a cascading manner. A port between connected devices needs to be configured as a cascaded port, and a transmitted virtualization packet is marked with a DSA tag. At an interface board of the Master node, the interface board removes the DSA tag, and in this case, when a virtualization packet and a non-virtualization packet simultaneously reach a port of the Master node, the Master cannot distinguish between the virtualization packet and the non-virtualization packet. Because the virtualization packet and the non-virtualization packet are processed in different manners, if the Master node cannot distinguish between the virtualization packet and the non-virtualization packet, a packet is incorrectly processed. For example, the virtualization packet is considered as the non-virtualization packet in processing.

SUMMARY

Embodiments of the present disclosure provide a method for communicating by using a remote network element port, and an apparatus, so that a virtualization packet and a non-virtualization packet can be distinguished, and the virtualization packet is correctly processed.

According to a first aspect, an embodiment of the present disclosure provides a method for communicating by using a remote network element port, where the method is applied to a virtual network element, the virtual network element includes a master node and an egress AP, the egress AP is a remote network element of the master node, and the method includes:

determining, by the master node, a virtual port corresponding to a virtualization packet, and adding a first layer virtual local area network VLAN tag to the virtualization packet according to the virtual port corresponding to the virtualization packet;

sending, by the master node, the virtualization packet to the egress AP according to the first layer VLAN tag;

determining, by the egress AP, a remote network element port corresponding to the virtualization packet according to the first layer VLAN tag; and removing, by the egress AP, the first layer VLAN tag, and sending the virtualization packet to a network device other than the virtual network element by using the remote network element port corresponding to the virtualization packet.

With reference to the implementation of the first aspect, in a first possible implementation of the first aspect, the master node has multiple virtual ports, each virtual port of the master node is corresponding to one first layer VLAN tag, and each first layer VLAN tag is corresponding to one remote network element port.

With reference to the implementation of the first aspect or the first possible implementation of the first aspect, in a second possible implementation of the first aspect, the virtual network element further includes at least one intermediate AP, and the sending, by the master node, the virtualization packet to the egress AP according to the first layer VLAN tag includes:

sending, by the master node, the virtualization packet to the intermediate AP according to the first layer VLAN tag, and forwarding, by the intermediate AP, the virtualization packet to the egress AP according to the first layer VLAN tag.

With reference to the implementation of the first aspect or the first possible implementation of the first aspect, in a third possible implementation of the first aspect, the virtual network element further includes at least one interface board, and after the adding a first layer virtual local area network VLAN tag to the virtualization packet according to the virtual port corresponding to the virtualization packet, the method further includes:

adding, by the master node, a second layer tag to the virtualization packet outside the first layer VLAN tag; and the sending, by the master node, the virtualization packet to the egress AP according to the first layer VLAN tag includes:

sending, by the master node, the virtualization packet to a target interface board in the at least one interface board according to the second layer tag;

determining, by the target interface board, a transmit port of the virtualization packet according to the second layer tag; and removing, by the target interface board, the second layer tag, and sending the virtualization packet to the egress AP by using the transmit port.

With reference to the third possible implementation of the first aspect, in a fourth possible implementation of the first aspect, the virtual network element further includes at least one intermediate AP, and the sending the virtualization packet to the egress AP by using the transmit port includes:

sending, by the target interface board, the virtualization packet to the intermediate AP by using the transmit port, and forwarding, by the intermediate AP, the virtualization packet to the egress AP according to the first layer VLAN tag.

With reference to any one of the first aspect, or the first to the fourth possible implementations of the first aspect, in a fifth possible implementation of the first aspect, the second layer tag is a distributed switching architecture DSA header.

With reference to any one of the first aspect, or the first to the fourth possible implementations of the first aspect, in a sixth possible implementation of the first aspect, the second layer tag is a second layer VLAN tag.

According to a second aspect, an embodiment of the present disclosure provides a method for communicating by using a remote network element port, where the method is applied to a virtual network element, the virtual network element includes: a master node and an ingress access point AP, the ingress AP is a remote network element of the master node, and the method includes:

receiving, by the ingress AP, a packet sent by a network device other than the virtual network element, and if the packet sent by the network device is a virtualization packet, adding a first layer virtual local area network VLAN tag to the virtualization packet according to a corresponding remote network element port that receives the virtualization packet, where the ingress AP includes at least one remote network element port, and one remote network element port of the ingress AP is corresponding to one first layer VLAN tag;

forwarding, by the ingress AP, the virtualization packet to the master node according to the first layer VLAN tag;

determining, by the master node, a virtual port corresponding to the virtualization packet according to the first layer VLAN tag, where the master node has multiple virtual ports, and one virtual port of the master node is corresponding to one first layer VLAN tag; and removing, by the master node, the first layer VLAN tag, and forwarding the virtualization packet according to the virtual port corresponding to the virtualization packet.

With reference to the implementation of the second aspect, in a first possible implementation of the second aspect, the master node has multiple virtual ports, each virtual port of the master node is corresponding to one first layer VLAN tag, and each first layer VLAN tag is corresponding to one remote network element port.

With reference to the second aspect or the first possible implementation of the second aspect, in a second possible implementation of the second aspect, the virtual network element further includes at least one intermediate AP, and the forwarding, by the ingress AP, the virtualization packet to the master node according to the first layer VLAN tag includes:

sending, by the ingress AP, the virtualization packet to the intermediate AP according to the first layer VLAN tag, and forwarding, by the intermediate AP, the virtualization packet to the master node according to the first layer VLAN tag.

With reference to any one of the second aspect, or the first to the second possible implementations of the second aspect, in a third possible implementation of the second aspect, the virtual network element further includes at least one interface board, and before the determining, by the master node, a virtual port corresponding to the virtualization packet according to the first layer VLAN tag, the method further includes:

forwarding, by the ingress AP, the virtualization packet to a target interface board in the at least one interface board according to the first layer VLAN tag;

adding, by the target interface board, a second layer tag to the virtualization packet outside the first layer VLAN tag according to a receive port of the virtualization packet;

forwarding, by the target interface board, the virtualization packet to the master node according to the second layer tag; and determining, by the master node according to the second layer tag, that the received packet is a virtualization packet, and removing the second layer tag.

With reference to any one of the second aspect, or the first to the third possible implementations of the second aspect, in a fourth possible implementation of the second aspect, the second layer tag is a distributed switching architecture DSA header.

With reference to any one of the second aspect, or the first to the third possible implementations of the second aspect, in a fifth possible implementation of the second aspect, the second layer tag is a second layer VLAN tag.

According to a third aspect, an embodiment of the present disclosure provides a virtual network element, where the virtual network element includes: a master node and an egress AP, and the egress AP is a remote network element of the master node;

the master node is configured to: determine a virtual port corresponding to a virtualization packet, and add a first layer virtual local area network VLAN tag to the virtualization packet according to the virtual port corresponding to the virtualization packet, where the master node has multiple virtual ports, one virtual port of the master node is corresponding to one first layer VLAN tag, and one first layer VLAN tag is corresponding to one remote network element port of the egress AP;

the master node is further configured to send the virtualization packet to the egress AP according to the first layer VLAN tag;

the egress AP is configured to determine a remote network element port corresponding to the virtualization packet according to the first layer VLAN tag; and the egress AP is further configured to: remove the first layer VLAN tag, and send the virtualization packet to a network device other than the virtual network element by using the remote network element port corresponding to the virtualization packet.

With reference to the implementation of the third aspect, in a first possible implementation of the third aspect, the master node has multiple virtual ports, each virtual port of the master node is corresponding to one first layer VLAN tag, and each first layer VLAN tag is corresponding to one remote network element port.

With reference to the implementation of the third aspect or the first possible implementation of the third aspect, in a second possible implementation of the third aspect, the virtual network element further includes at least one intermediate AP, where:

the master node is configured to send the virtualization packet to the intermediate AP according to the first layer VLAN tag; and the intermediate AP is configured to forward the virtualization packet to the egress AP according to the first layer VLAN tag.

With reference to the implementation of the third aspect or the first possible implementation of the third aspect, in a third possible implementation of the third aspect, the virtual network element further includes at least one interface board, and the master node is further configured to:

add a second layer tag to the virtualization packet outside the first layer VLAN tag; and send the virtualization packet to a target interface board in the at least one interface board according to the second layer tag; where the target interface board is configured to determine a transmit port of the virtualization packet according to the second layer tag; and the target interface board is further configured to: remove the second layer tag, and send the virtualization packet to the egress AP by using the transmit port.

With reference to the third possible implementation of the third aspect, in a fourth possible implementation of the third aspect, the virtual network element further includes at least one intermediate AP, where:

the master node is configured to send the virtualization packet to the intermediate AP in the multiple APs by using the transmit port; and the intermediate AP is configured to forward the virtualization packet to the egress AP according to the first layer VLAN tag.

With reference to any one of the third aspect, or the first to the fourth possible implementations of the third aspect, in a fifth possible implementation of the third aspect, the second layer tag is a distributed switching architecture DSA header.

With reference to any one of the third aspect, or the first to the fourth possible implementations of the third aspect, in a sixth possible implementation of the third aspect, the second layer tag is a second layer VLAN tag.

According to a fourth aspect, an embodiment of the present disclosure provides a virtual network element, where the virtual network element includes: a master node and an ingress AP, and the ingress AP is a remote network element of the master node;

the ingress AP is configured to: receive a packet sent by a network device other than the virtual network element, and if the packet sent by the network device is a virtualization packet, add a first layer virtual local area network VLAN tag to the virtualization packet according to a corresponding remote network element port that receives the virtualization packet, where the ingress AP is any one of multiple APs, the ingress AP includes at least one remote network element port, and one remote network element port of the ingress AP is corresponding to the first layer VLAN tag;

the ingress AP is further configured to forward the virtualization packet to the master node according to the first layer VLAN tag;

the master node is configured to determine a virtual port corresponding to the virtualization packet according to the first layer VLAN tag, where the master node has multiple virtual ports, and one virtual port of the master node is corresponding to one first layer VLAN tag; and the master node is further configured to: remove the first layer VLAN tag, and forward the virtualization packet according to the virtual port corresponding to the virtualization packet.

With reference to the implementation of the fourth aspect, in a first possible implementation of the fourth aspect, the master node has multiple virtual ports, each virtual port of the master node is corresponding to one first layer VLAN tag, and each first layer VLAN tag is corresponding to one remote network element port.

With reference to the implementation of the fourth aspect or the first possible implementation of the fourth aspect, in a second possible implementation of the fourth aspect, the virtual network element further includes at least one intermediate AP, where:

the ingress AP is configured to send the virtualization packet to the intermediate AP according to the first layer VLAN tag; and the intermediate AP is configured to forward the virtualization packet to the master node according to the first layer VLAN tag.

With reference to the implementation of the fourth aspect or the first possible implementation of the fourth aspect, in a third possible implementation of the fourth aspect, the virtual network element further includes at least one interface board, and the ingress AP is further configured to forward the virtualization packet to a target interface board in the at least one interface board according to the first layer VLAN tag; where the target interface board is configured to add a second layer tag to the virtualization packet outside the first layer VLAN tag according to a receive port of the virtualization packet;

the target interface board is further configured to forward the virtualization packet to the master node according to the second layer tag; and the master node is further configured to: determine, according to the second layer tag, that the received packet is a virtualization packet, and remove the second layer tag.

With reference to any one of the fourth aspect, or the first to the third possible implementations of the fourth aspect, in a fourth possible implementation of the fourth aspect, the second layer tag is a distributed switching architecture DSA header.

With reference to any one of the fourth aspect, or the first to the third possible implementations of the fourth aspect, in a fifth possible implementation of the fourth aspect, the second layer tag is a second layer VLAN tag.

According to the method for communicating by using a remote network element port, and the apparatus that are provided in the embodiments of the present disclosure, a master node adds a first layer VLAN tag to an outer layer of a virtualization packet according to a virtual port corresponding to the virtualization packet, so that an egress AP can determine a remote network element port corresponding to the virtualization packet according to the first layer VLAN tag, so as to send the virtualization packet by using the remote network element port corresponding to the virtualization packet. In the method, the master node adds the first layer VLAN tag to the virtualization packet according to the virtual port corresponding to the virtualization packet, so that the master node and the egress AP can distinguish between the virtualization packet and a non-virtualization packet according to the first layer VLAN tag, and the virtualization packet is correctly processed.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show some embodiments of the present disclosure, and a person of ordinary skill in the art may still derive other drawings from these accompanying drawings without creative efforts.

DESCRIPTION OF EMBODIMENTS

Figure 1:
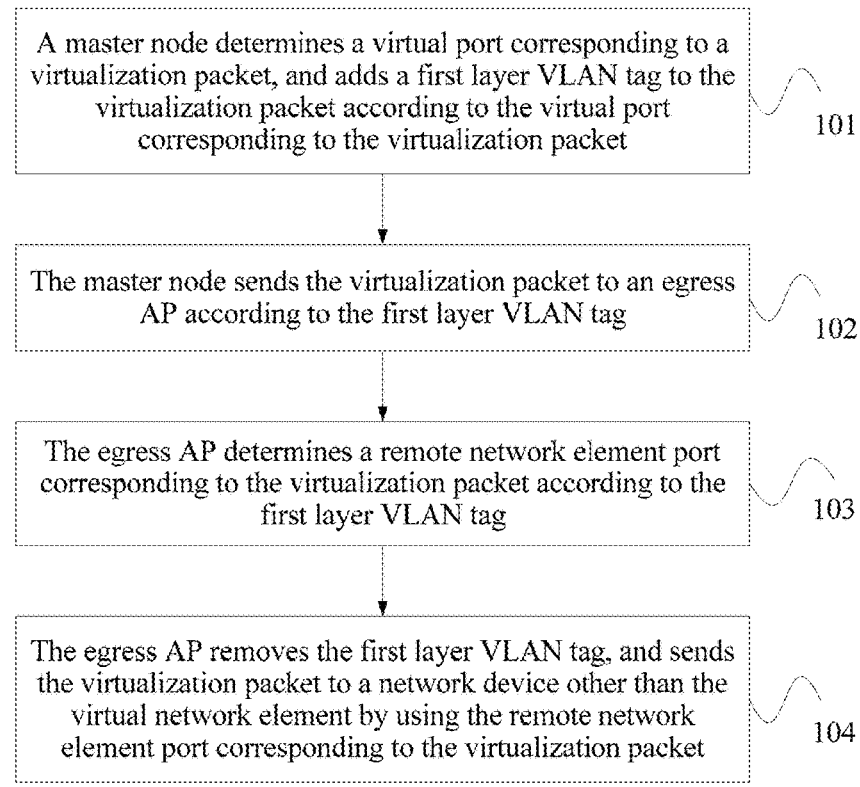
FIG. 1 is a flowchart of a method for communicating by using a remote network element port according to Embodiment 1 of the present disclosure.

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Methods in the embodiments of the present disclosure are applied to a virtual network element, and the virtual network element includes: a master node and multiple APs. The multiple APs are remote network elements of the master node, and the remote network element is described relative to the master node. On the virtual network element, a port provided for an external device of the virtual network element is a virtual port (Virtual Port, VP for short) on the virtual network element. Multiple virtual ports may be provided on the master node. From a perspective of a user side, a packet sent by the virtual network element is sent from a virtual port of the master node. Actually, the packet sent by the virtual network element is finally sent from a physical port of an AP. A channel from the virtual port of the virtual network element to the AP is referred to as a remote channel. After the packet enters the virtual port, the packet moves along the remote channel and is finally sent by using the physical port of the AP. The physical port that actually sends the packet is referred to as a remote network element port. Therefore, there is a one-to-one correspondence between the multiple virtual ports of the master node and remote network element ports of the multiple APs. When an AP has multiple remote network element ports, each remote network element port of the AP is corresponding to one virtual port of the master node. A packet that enters from a virtual port can be sent only from a remote network element port corresponding to the virtual port. Similarly, a packet that enters from a remote network element port can be sent only from a virtual port corresponding to the remote network element port.

In the embodiments of the present disclosure, the multiple APs are classified into an ingress AP, an egress AP, and an intermediate AP. It should be noted that the classification of the ingress AP, the egress AP, and the intermediate AP is merely function classification, and any AP may be the ingress AP, the egress AP, or the intermediate AP. When a forwarding path of a virtualization packet is from an AP to a master node, the multiple APs are classified into an ingress AP and an intermediate AP; the ingress AP is an AP to which a remote network element port that receives the virtualization packet belongs, that is, the first AP that the virtualization packet passes through after the virtualization packet enters the virtual network element from another network element (a network element other than the virtual network element) or a terminal; an AP other than the ingress AP is referred to as the intermediate AP. When a forwarding path of a virtualization packet is from a master node to an AP, the multiple APs are classified into an egress AP and an intermediate AP; the egress AP is an AP to which a remote network element port that sends the virtualization packet belongs, that is, the last AP that the virtualization packet passes through in the virtual network element; the intermediate AP is an AP other than the egress AP in the virtual network element.

Figure 2:
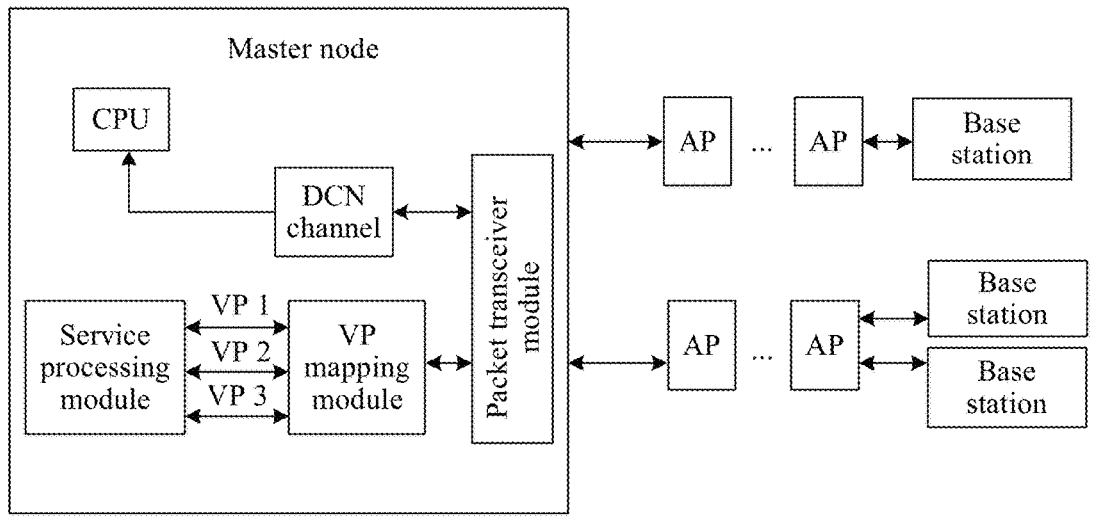
FIG. 2 is a schematic structural diagram of a virtual network element that is applicable to Embodiment 1.

FIG. 1 is a flowchart of a method for communicating by using a remote network element port according to Embodiment 1 of the present disclosure. FIG. 2 is a schematic structural diagram of a virtual network element that is applicable to Embodiment 1. As shown in FIG. 2, the virtual network element includes a master node and multiple APs. The master node includes: a packet transceiver module, a VP mapping module, a data communication network (Data Communication Network, DCN for short) channel, a service processing module, and a central processing unit (Central Processing Unit, CPU for short). Multiple virtual ports are disposed between the service processing module and the VP mapping module, and three virtual ports are used as an example in FIG. 2. When a virtualization packet is being sent from the master node to an AP, the service processing module is configured to send the virtualization packet to the VP mapping module by using a corresponding virtual port according to configuration of the virtual ports. For example, formats of virtualization packets that can pass through the virtual ports are configured for the virtual ports. For example, media access control (Media Access Control, MAC for short) addresses of the virtualization packets that are allowed to pass through are configured for the virtual ports, or Internet Protocol (Internet Protocol, IP for short) addresses of the virtualization packets that are allowed to pass through are configured for the virtual ports, or user VLANs of the virtualization packets that are allowed to pass through are configured for the virtual ports. The user VLAN is a VLAN added to the packet on the user side. The VP mapping module is configured to perform VP mapping on the virtualization packet sent by the service processing module. Specifically, the VP mapping module adds a first layer VLAN tag to the virtualization packet according to the virtual port corresponding to the virtualization packet, and then sends the virtualization packet to the packet transceiver module. The packet transceiver module sends the packet to the AP by using a physical port of the master node according to the first layer VLAN tag. Optionally, the packet transceiver module is further configured to send a non-virtualization packet to the AP by using the physical port of the master node, where the non-virtualization packet is sent by the CPU by using the DCN channel. Service packets on the master node may be classified into a control packet and a service packet according to functions. The control packet is used to transmit control signaling. The service packet is used to carry user data. The non-virtualization packet sent by the CPU by using the DCN channel is the control packet. The packet transceiver module determines whether a received packet on the physical port of the master node is a virtualization packet or a non-virtualization packet, then sends the virtualization packet to the VP mapping module, and sends the non-virtualization packet to the CPU by using the DCN channel. When a virtualization packet is being sent from an AP to the master node, the packet transceiver module determines whether the received packet on the physical port of the master node is a virtualization packet or a non-virtualization packet. Specifically, if the received packet on the physical port of the master node includes a first layer VLAN tag, the packet is the virtualization packet; otherwise, the packet is the non-virtualization packet. The first layer VLAN tag is added to the virtualization packet in the virtual network element. If the packet is the virtualization packet, the virtualization packet is sent to the VP mapping module. If the packet is the non-virtualization packet, the non-virtualization packet is sent to the CPU by using the DCN channel. The VP mapping module determines a virtual port corresponding to the virtualization packet according to the first layer VLAN tag. Then, the virtualization packet is sent to the service processing module by using the corresponding virtual port, and the service processing module receives the packet from the virtual port corresponding to the virtualization packet and processes the packet.

As shown in FIG. 1, the method in this embodiment may include the following steps.

Step 101: A master node determines a virtual port corresponding to a virtualization packet, and adds a first layer VLAN tag to the virtualization packet according to the virtual port corresponding to the virtualization packet.

In this embodiment, each virtual port of the master node is corresponding to one first layer VLAN tag, and each VLAN tag is corresponding to one remote network element port. Packets sent by the master node and multiple APs are classified into two types: a virtualization packet and a non-virtualization packet. A difference between the virtualization packet and the non-virtualization packet is that the first layer VLAN tag is added to the virtualization packet in a virtual network element, and the first layer VLAN tag is not added to the non-virtualization packet in the virtual network element. For example, a packet may carry a one-layer tag or a multilayer tag before the packet enters the virtual network element from a user side. In this case, whether the packet is a virtualization packet or a non-virtualization packet does not need to be distinguished. After the packet enters the virtual network element from the user side, the virtual network element may add a one-layer tag to the packet to make the packet become a virtualization packet; or the virtual network element may add no tag to the packet to make the packet become a non-virtualization packet.

Specifically, the virtual port corresponding to the virtualization packet may be determined by a service processing module on the master node according to configuration of a virtualization service. The virtual port corresponding to the virtualization packet is a corresponding virtual port that is configured to transmit the virtualization packet. Then, the virtualization packet is sent to a VP mapping module by using the virtual port corresponding to the virtualization packet, and the VP mapping module determines the virtual port corresponding to the virtualization packet according to a receive port of the virtualization packet. Then, the first layer VLAN tag of the virtualization packet is determined according to the virtual port corresponding to the virtualization packet and a correspondence between multiple virtual ports of the master node and multiple first layer VLAN tags, and the first layer VLAN tag is added to the virtualization packet. Before the VP mapping module performs VP mapping, a packet format is: DA+SA+Payload, and after the VP mapping module performs the VP mapping, the packet format is: DA+SA+VLAN 1+Payload. VLAN1 indicates the first layer VLAN tag, and Payload indicates a payload in the packet. SA indicates a source address for forwarding the packet, and DA indicates a destination address for forwarding the packet.

A virtualization packet that passes through each virtual port of the master node has a unique first layer VLAN tag, and first layer VLAN tags of virtualization packets that pass through virtual ports are different from each other. For example, the master node has three virtual ports. A first layer VLAN tag of a virtualization packet that passes through a virtual port 1 is VLAN 1, a first layer VLAN tag of a virtualization packet that passes through a virtual port 2 is VLAN 2, and a first layer VLAN tag of a virtualization packet that passes through a virtual port 3 is VLAN 3. In this embodiment, VLAN tags in the entire virtual network element may be allocated and managed by a centralized controller on the master node.

Step 102: The master node sends the virtualization packet to an egress AP according to the first layer VLAN tag.

The egress AP is an AP to which a remote network element port corresponding to the virtualization packet belongs. If there is only one AP in a remote channel, the AP is the egress AP, and the master node directly sends the virtualization packet to the egress AP according to the first layer VLAN tag. If there are multiple APs in the remote channel, the master node sends the virtualization packet to an intermediate AP in the multiple APs according to the first layer VLAN tag, and the intermediate AP forwards the virtualization packet to the egress AP according to the first layer VLAN tag.

In this embodiment, a QinQ protocol packet is used in each AP, QinQ is referred to as Stacked VLAN or Double VLAN, and a double-layer VLAN tag (tag) is used in QinQ. Specifically, when a virtualization packet is transmitted on a user side network, the virtualization packet carries a private one-layer VLAN tag. When the virtualization packet enters the virtual network element from the user side network, the master node adds a first layer VLAN tag to the virtualization packet. The first layer VLAN tag is used as an outer layer tag of the virtualization packet, and in the QinQ protocol, network elements forward the virtualization packet according to the outer layer VLAN tag. Therefore, each AP in the virtual network element forwards the virtualization packet according to the first layer VLAN tag, and the first layer VLAN tag is removed when the virtualization packet leaves the virtual network element.

Step 103: The egress AP determines a remote network element port corresponding to the virtualization packet according to the first layer VLAN tag.

Physical ports of the egress AP are classified into a remote network element port and a local port. The remote network element port is configured to transmit and receive a virtualization packet, and the local port is configured to transmit and receive a non-virtualization packet. A quantity of remote network element ports and a quantity of local ports on the egress AP are not limited in this embodiment. A correspondence between each remote network element port and a VLAN tag of a packet that passes through each remote network element port is configured in advance on the egress AP. After receiving the virtualization packet that is sent by the intermediate AP, the egress AP determines the remote network element port corresponding to the virtualization packet according to the first layer VLAN tag of the virtualization packet. The remote network element port corresponding to the virtualization packet is a remote network element port that is configured to send the virtualization packet.

Step 104: The egress AP removes the first layer VLAN tag, and sends the virtualization packet to a network device other than the virtual network element by using the remote network element port corresponding to the virtualization packet.

In this embodiment, a role of adding the first layer VLAN tag to the virtualization packet by the master node is to enable the intermediate AP and the egress AP to identify the virtualization packet and forward the virtualization packet to the remote network element port corresponding to the virtual port of the master node according to the first layer VLAN tag. However, a virtualization packet and a non-virtualization packet do not need to be distinguished on a user side, and forwarding does not need to be performed according to the first layer VLAN tag. Therefore, the egress AP needs to remove the first layer VLAN tag before sending the virtualization packet to another network device.

A first layer VLAN tag needs to be removed before each virtualization packet that is to be sent on a remote network element port of the egress AP is sent. Therefore, after the egress AP determines, according to the first layer VLAN tag, to send the virtualization packet from the virtual network element port, the egress AP removes the first layer VLAN tag of the virtualization packet, and then sends the virtualization packet to the network device other than the virtual network element. For example, the network device other than the virtual network element is a base station.

According to the method in this embodiment of the present disclosure, a master node adds a first layer VLAN tag to an outer layer of a virtualization packet according to a virtual port corresponding to the virtualization packet, and then sends the virtualization packet to an egress AP. The egress AP can determine a remote network element port corresponding to the virtualization packet according to the first layer VLAN tag, so as to send the virtualization packet by using the remote network element port corresponding to the virtualization packet. In the method, the master node adds the first layer VLAN tag to the virtualization packet according to the virtual port corresponding to the virtualization packet, so that the master node and the egress AP can distinguish between the virtualization packet and a non-virtualization packet according to the first layer VLAN tag, and the virtualization packet is correctly processed.

It should be noted that, the method in this embodiment imposes no impact on non-virtualization service forwarding, and the non-virtualization service is forwarded according to an existing solution.

Figure 3:
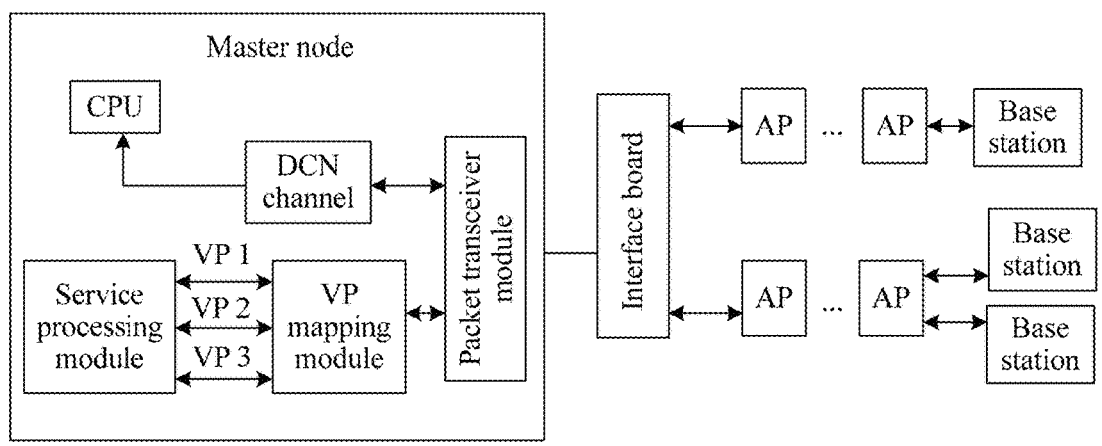
FIG. 3 is a schematic structural diagram of a virtual network element that is applicable to Embodiment 2.

In Embodiment 1, the master node is directly connected to the AP. In Embodiment 2 of the present disclosure, a virtual network element further includes at least one interface board, and a master node and multiple APs are connected and communicate by using the at least one interface board. FIG. 3 is a schematic structural diagram of a virtual network element that is applicable to Embodiment 2. As shown in FIG. 3, the virtual network element shown in FIG. 3 is a virtual network element obtained after an interface board is added to the master node of the virtual network element shown in FIG. 2, and the interface board is connected to the AP. Only one interface board is shown in FIG. 3, and certainly, the master node may have more interface boards. Each interface board has multiple physical ports, some physical ports are configured to transmit a virtualization packet, and some physical ports are configured to transmit a non-virtualization packet. A physical port configured to transmit a virtualization packet and a physical port configured to transmit a non-virtualization packet on the interface board may have the same port number. Therefore, when receiving a packet sent by the master node, the interface board needs to determine whether the packet is a virtualization packet or a non-virtualization packet, so as to send the received packet to an intermediate AP or an egress AP by using a correct physical port. In this embodiment of the present disclosure, a second layer tag is encapsulated outside a first layer VLAN tag, so that the interface board distinguishes between a virtualization packet and a non-virtualization packet according to the second layer tag. Correspondingly, when a virtualization packet is transmitted from the master node to the AP, a VP mapping module is further configured to add the second layer tag outside the first layer VLAN tag. A packet transceiver module is further configured to determine, according to the second layer tag, a physical port that is of the master node and through which the packet is sent to a target interface board. The master node has multiple physical ports, and different physical ports are connected to different interface boards. Therefore, the master node needs to determine, according to the second layer tag, a physical port that is of the master node and through which the virtualization packet is sent. The master node may be connected to multiple interface boards, and the target interface board is an interface board that currently receives the virtualization packet.

The target interface board is connected to the AP by using multiple physical ports, and some ports in the multiple physical ports that connect the target interface board and the AP are configured to transmit and receive a virtualization packet. For the physical ports configured to transmit and receive a virtualization packet, second layer tags of packets that are allowed to pass through the physical ports configured to transmit and receive a virtualization packet are configured in advance. After receiving a virtualization packet sent by the packet transceiver module of the master node, the target interface board determines a transmit port of the virtualization packet according to a second layer tag, where the transmit port herein is a physical port on the target interface board. Then, the second layer tag of the virtualization packet is removed, and the virtualization packet is sent to the intermediate AP or the egress AP by using the determined transmit port. When a virtualization packet is transmitted from the AP to the master node, if a physical port that is on the target interface board and that receives the virtualization packet is a physical port that transmits a virtualization packet, the target interface board determines that the received packet is a virtualization packet. Then, the master node adds a second layer tag to the virtualization packet, and sends, to the packet transceiver module, the virtualization packet to which the second layer tag is added. After receiving the virtualization packet sent by the target interface board, the packet transceiver module determines, according to the second layer tag of the virtualization packet, to send the virtualization packet to a VP mapping module. The VP mapping module removes the second layer tag, and determines a virtual port corresponding to the virtualization packet according to the first layer VLAN tag. Then, the first layer VLAN tag is removed, and the virtualization packet is sent to a service processing module by using the virtual port corresponding to the virtualization packet.

Figure 4:
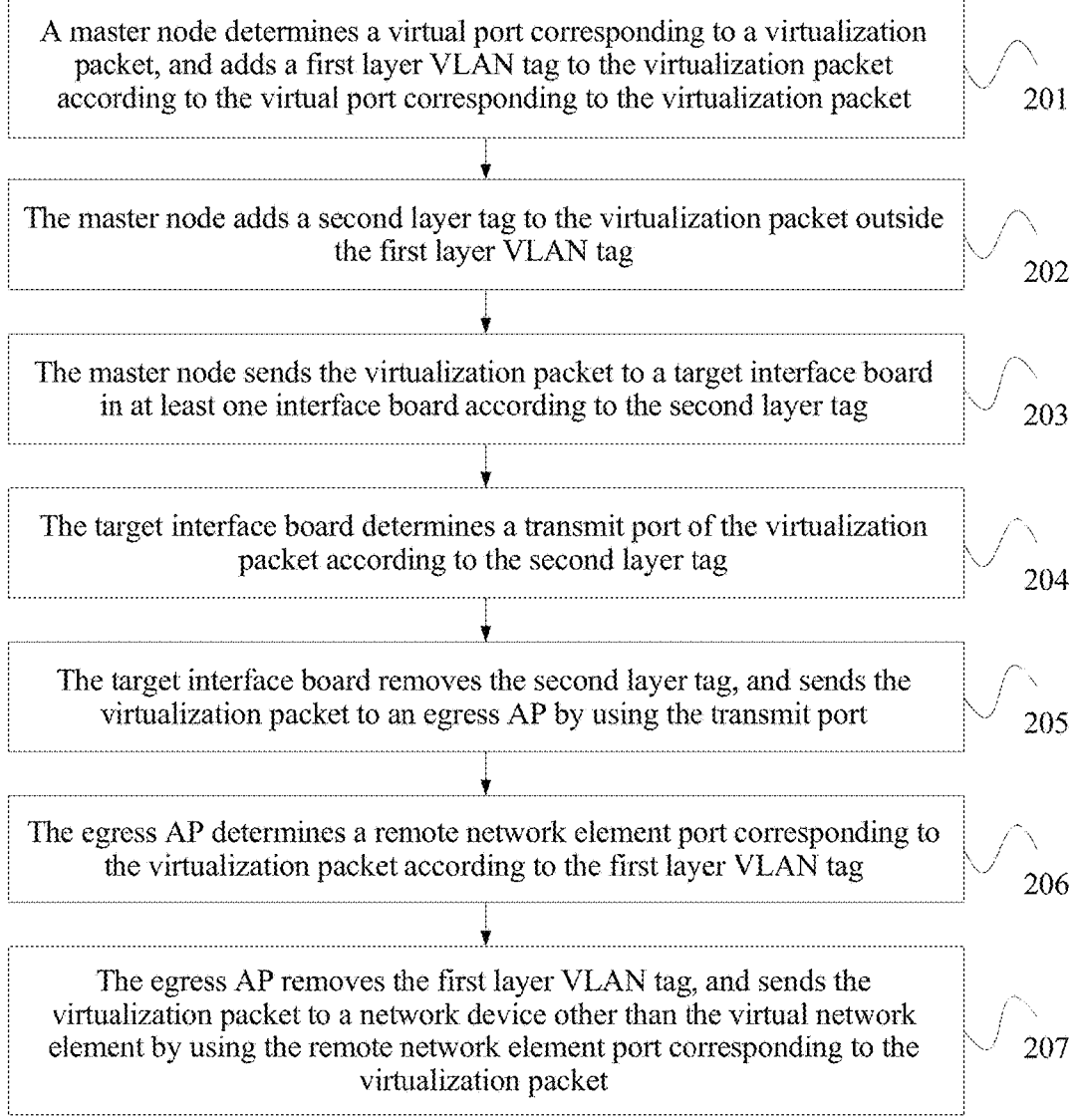
FIG. 4 is a flowchart of a method for communicating by using a remote network element port according to Embodiment 2 of the present disclosure.

FIG. 4 is a flowchart of a method for communicating by using a remote network element port according to Embodiment 2 of the present disclosure. Referring to FIG. 3 and FIG. 4, the method provided by this embodiment may include the following steps.

Step 201: A master node determines a virtual port corresponding to a virtualization packet, and adds a first layer VLAN tag to the virtualization packet according to the virtual port corresponding to the virtualization packet.

Step 202: The master node adds a second layer tag to the virtualization packet outside the first layer VLAN tag.

In this embodiment, the master node has at least one interface board. There are multiple physical ports between each interface board and an AP, and virtualization packets that are received from a physical port of the master node may need to be sent by using multiple physical ports of the interface board. Therefore, the interface board needs to determine a physical port through which a virtualization packet is supposed to be sent. For example, the interface board and the master node are connected by using a physical interface. A packet transceiver module may send five virtualization packets whose first layer VLAN tags are VLAN 11 to VLAN 15 to the interface board by using the physical interface between the interface board and the master node. There are three physical ports between the interface board and the AP, a physical port 1 is configured to send a non-virtualization packet, and a physical port 2 and a physical port 3 are configured to send a virtualization packet. If a second layer VLAN tag is not added, the interface board does not know which virtualization packet in the virtualization packets carrying VLAN 11 to VLAN 15 is sent by using the physical port 2, and which virtualization packet is sent by using the physical port 3.

In this embodiment, a role of adding the second layer tag is to enable the target interface board to distinguish between a virtualization packet and a non-virtualization packet according to the second layer tag, and after determining the virtualization packet, further determine, according to the second layer tag of the virtualization packet, a physical port through which the virtualization packet is sent. Specifically, the second layer tag may be added to the virtualization packet by a VP mapping module on the master node, and the second layer tag may be specifically a DSA header or a second layer VLAN tag. Before the VP mapping module performs mapping, a packet format is: DA+SA+Payload, and after the VP mapping module performs mapping, the packet format is: DA+SA+VLAN 2+VLAN 1+Payload or DA+SA+DSA+VLAN 1+Payload. VLAN 1 indicates the first layer VLAN tag, and VLAN 2 and DSA indicate the second layer tag.

Step 203: The master node sends the virtualization packet to a target interface board in at least one interface board according to the second layer tag.

A forwarding rule of a virtualization packet is configured on the master node, for example, 5-tuple information and a MAC address are included. The forwarding rule defines a format of a packet that is allowed to pass through each physical port of the master node. For example, the physical port 1 of the master node allows only a virtualization packet to pass through, and the physical port 2 of the master node allows only a non-virtualization packet to pass through; or both the physical port 1 and the physical port 2 of the master node allow a virtualization packet to pass through and allow a non-virtualization packet to pass through. Different physical ports of the master node allow different virtualization packets to pass through. Therefore, the master node needs to determine, according to the second layer tag and the formats of the packets that are allowed to pass through the physical ports, a physical port through which a virtualization packet is sent. The packet transceiver module of the master node may determine a transmit port of the virtualization packet according to the second layer tag, and send the virtualization packet to a corresponding target interface board by using the transmit port.

Step 204: The target interface board determines a transmit port of the virtualization packet according to the second layer tag.

Step 205: The target interface board removes the second layer tag, and sends the virtualization packet to an egress AP by using the transmit port.

Compared with Embodiment 1, in this embodiment, the master node adds the second layer tag outside the first layer VLAN tag. A role of the second layer tag is to enable the interface board to determine the transmit port of the virtualization packet. Therefore, the second layer tag should be removed after the interface board determines the transmit port of the virtualization packet.

If a remote channel has only one AP, the AP is the egress AP, and the target interface board directly sends the virtualization packet to the egress AP. If a remote channel includes multiple APs, the target interface board sends the virtualization packet to an intermediate AP in the multiple APs by using the transmit port, and the intermediate AP forwards the virtualization packet to the egress AP according to the first layer VLAN tag.

Step 206: The egress AP determines a remote network element port corresponding to the virtualization packet according to the first layer VLAN tag.

In this embodiment, the master node has multiple virtual ports, each virtual port of the master node is corresponding to one first layer VLAN tag, and each first layer VLAN tag is corresponding to one remote network element port.

Step 207: The egress AP removes the first layer VLAN tag, and sends the virtualization packet to a network device other than the virtual network element by using the remote network element port corresponding to the virtualization packet.

According to the method in this embodiment of the present disclosure, a master node adds a first layer VLAN tag and a second layer tag to an outer layer of a virtualization packet according to a virtual port corresponding to the virtualization packet, so that an interface board forwards the virtualization packet to an egress AP according to the second layer tag, and the egress AP can determine a remote network element port corresponding to the virtualization packet according to the first layer VLAN tag, and send the virtualization packet by using the corresponding remote network element port. In the method, the master node adds two layers of tags to the virtualization packet according to the virtual port corresponding to the virtualization packet, so that the master node, the egress AP, and the interface board can distinguish between the virtualization packet and a non-virtualization packet according to the two layers of tags, and the virtualization packet is correctly processed.

The forwarding path of a packet in Embodiment 1 and Embodiment 2 is from the master node to the AP. A forwarding path of a packet in the following Embodiment 3 and Embodiment 4 is from an AP to a master node.

Figure 5:
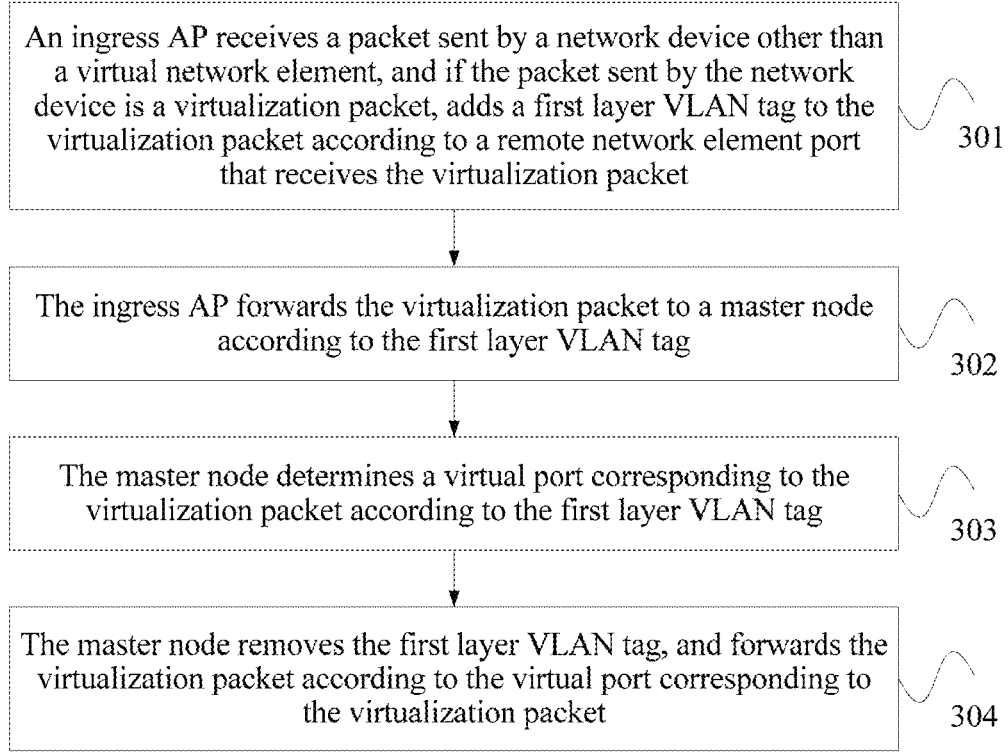
FIG. 5 is a flowchart of a method for communicating by using a remote network element port according to Embodiment 3 of the present disclosure.

FIG. 5 is a flowchart of a method for communicating by using a remote network element port according to Embodiment 3 of the present disclosure. A virtual network element that is applicable to the method in this embodiment is the same as the virtual network element shown in FIG. 2. Referring to FIG. 2 and FIG. 5, the method provided by this embodiment may include the following steps.

Step 301: An ingress AP receives a packet sent by a network device other than a virtual network element, and if the packet sent by the network device is a virtualization packet, adds a first layer VLAN tag to the virtualization packet according to a remote network element port that receives the virtualization packet.

The ingress AP has multiple physical ports, some physical ports are configured to transmit and receive a virtualization packet, and some ports are configured to transmit and receive a non-virtualization packet. Therefore, the packet received by the ingress AP may be a virtualization packet or may be a non-virtualization packet. If a receive port of the packet is a remote network element port, it indicates that the received packet is a virtualization packet. The ingress AP may have multiple remote network element ports, and therefore, the ingress AP needs to determine the first layer VLAN tag of the virtualization packet according to the remote network element port that receives the virtualization packet. When the ingress AP may have multiple remote network element ports, each remote network element port is corresponding to a different first layer VLAN tag. After determining the first layer VLAN tag of the virtualization packet, the ingress AP adds the first layer VLAN tag to the virtualization packet. For the non-virtualization packet, the ingress AP does not need to add the first layer VLAN tag, and directly forwards the non-virtualization packet.

Step 302: The ingress AP forwards the virtualization packet to a master node according to the first layer VLAN tag.

If a remote channel has only the ingress AP, the ingress AP sends the virtualization packet to the master node according to the first layer VLAN tag. If a remote channel includes multiple APs, the ingress AP sends the virtualization packet to an intermediate AP in the multiple APs according to the first layer VLAN tag, and the intermediate AP forwards the virtualization packet to the master node according to the first layer VLAN tag.

Step 303: The master node determines a virtual port corresponding to the virtualization packet according to the first layer VLAN tag.

In this embodiment, the master node has multiple virtual ports, each virtual port is corresponding to one first layer VLAN tag, and each first layer VLAN tag is corresponding to one remote network element port. Therefore, the master node determines the virtual port corresponding to the virtualization packet according to a correspondence between the multiple virtual ports and multiple first layer VLAN tags, and the first layer VLAN tag of the virtualization packet. Each first layer VLAN tag is further corresponding to one remote network element port, that is, a virtualization packet carrying a first layer VLAN tag comes from one unique determined network element port, so that it is implemented that the master node maps the remote network element port of the AP onto a local virtual port.

Step 304: The master node removes the first layer VLAN tag, and forwards the virtualization packet according to the virtual port corresponding to the virtualization packet.

In this embodiment, a role of adding the first layer VLAN tag by the ingress AP is to enable the intermediate AP to forward the virtualization packet to the master node according to the first layer VLAN tag, and to enable the master node to determine the virtual port corresponding to the virtualization packet according to the first layer VLAN tag. For a user side, the first layer VLAN tag is not needed, and therefore, the master node removes the first layer VLAN tag after determining the virtual port corresponding to the virtualization packet.

Specifically, after receiving the virtualization packet, a packet transceiver module of the master node determines, according to the first layer VLAN tag, that the received packet is a virtualization packet, and then sends the virtualization packet to a VP mapping module. The VP mapping module determines the virtual port corresponding to the virtualization packet according to the first layer VLAN tag, and sends the virtualization packet to a service processing module by using the virtual port corresponding to the virtualization packet. The service processing module forwards the virtualization packet according to the virtual port corresponding to the virtualization packet.

According to the method in this embodiment of the present disclosure, an ingress AP adds a first layer VLAN tag to a virtualization packet according to a receive port of the virtualization packet, and forwards the virtualization packet to a master node according to the first layer VLAN tag. The master node determines a virtual port corresponding to the virtualization packet according to the first layer VLAN tag, and forwards the virtualization packet according to the virtual port corresponding to the virtualization packet. In the method, the ingress AP adds the first layer VLAN tag to the virtualization packet according to a remote network element port corresponding to the virtualization packet, so that the master node and the ingress AP can distinguish between the virtualization packet and a non-virtualization packet according to the first layer VLAN tag, and the virtualization packet is correctly processed.

Figure 6:
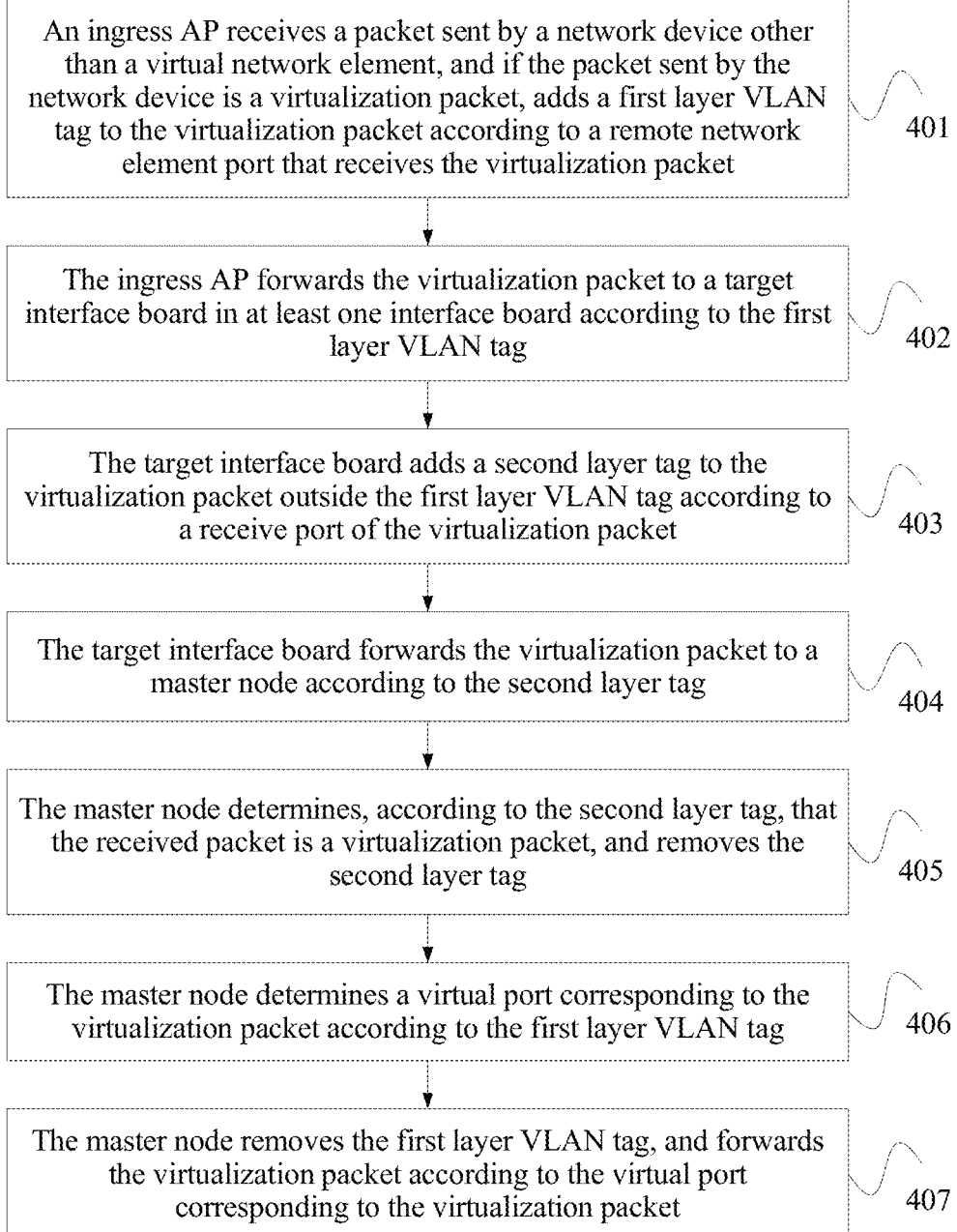
FIG. 6 is a flowchart of a method for communicating by using a remote network element port according to Embodiment 4 of the present disclosure.

In Embodiment 3, the master node is directly connected to the AP. In Embodiment 4 of the present disclosure, a virtual network element further includes at least one interface board, and a master node and multiple APs are connected and communicate by using the at least one interface board. For a structure of the virtual network element in this embodiment, reference may be made to the virtual network element shown in FIG. 3. FIG. 6 is a flowchart of a method for communicating by using a remote network element port according to Embodiment 4 of the present disclosure. Referring to FIG. 3 and FIG. 6, the method provided by this embodiment may include the following steps.

Step 401: An ingress AP receives a packet sent by a network device other than a virtual network element, and if the packet sent by the network device is a virtualization packet, adds a first layer VLAN tag to the virtualization packet according to a remote network element port that receives the virtualization packet.

Step 402: The ingress AP forwards the virtualization packet to a target interface board in at least one interface board according to the first layer VLAN tag.

If a remote channel has only the ingress AP, the ingress AP sends the virtualization packet to the target interface board according to the first layer VLAN tag. If the remote channel includes multiple APs, the ingress AP sends the virtualization packet to an intermediate AP in the multiple APs according to the first layer VLAN tag, and the intermediate AP forwards the virtualization packet to the target interface board according to the first layer VLAN tag.

Step 403: The target interface board adds a second layer tag to the virtualization packet outside the first layer VLAN tag according to a receive port of the virtualization packet.

The interface board has multiple physical ports, some physical ports are configured to transmit and receive a non-virtualization packet, and some physical ports are configured to transmit and receive a virtualization packet. If the receive port of the virtualization packet is a physical port configured to transmit and receive a virtualization packet, the target interface board determines the second layer tag of the virtualization packet according to the receive port of the virtualization packet, and adds the second layer tag to the virtualization packet.

Step 404: The target interface board forwards the virtualization packet to a master node according to the second layer tag.

Step 405: The master node determines, according to the second layer tag, that the received packet is a virtualization packet, and removes the second layer tag.

After receiving the virtualization packet, a packet transceiver module on the master node determines, according to the second layer tag, that the received packet is a virtualization packet, and then sends the virtualization packet to a VP mapping module, and the VP mapping module removes the second layer tag.

Step 406: The master node determines a virtual port corresponding to the virtualization packet according to the first layer VLAN tag.

In this embodiment, the master node has multiple virtual ports, each virtual port of the master node is corresponding to one first layer VLAN tag, and each first layer VLAN tag is corresponding to one remote network element port.

Step 407: The master node removes the first layer VLAN tag, and forwards the virtualization packet according to the virtual port corresponding to the virtualization packet.

Specifically, the VP mapping module determines the virtual port corresponding to the virtualization packet according to the first layer tag after removing the second layer tag, and then sends the virtualization packet to a service processing module by using the virtual port corresponding to the virtualization packet. The service processing module forwards the packet according to the virtual port corresponding to the virtualization packet.

According to the method in this embodiment of the present disclosure, an ingress AP adds a first layer VLAN tag to a virtualization packet according to a receive port of the virtualization packet. After receiving the virtualization packet, a target interface board of a master node sends the virtualization packet to the master node after adding a second layer tag to the virtualization packet. The master node determines, according to the second layer tag, that the received packet is a virtualization packet, and removes the second layer tag. The master node determines a virtual port corresponding to the virtualization packet according to the first layer VLAN tag, and forwards the virtualization packet according to the virtual port corresponding to the virtualization packet. In the method, two layers of tags are added to the virtualization packet, so that the master node, the ingress AP, and the interface board can distinguish between the virtualization packet and a non-virtualization packet according to the two layers of tags, and the virtualization packet is correctly processed.

Figure 7:
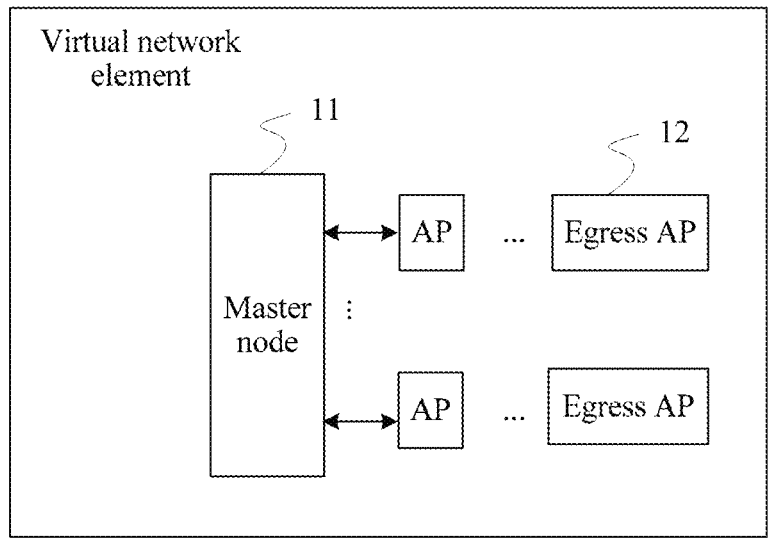
FIG. 7 is a schematic structural diagram of a virtual network element according to Embodiment 5 of the present disclosure.

FIG. 7 is a schematic structural diagram of a virtual network element according to Embodiment 5 of the present disclosure. As shown in FIG. 7, the virtual network element in this embodiment includes: a master node 11 and an egress AP 12, where the egress AP 12 is a remote network element of the master node 11.

The master node 11 is configured to: determine a virtual port corresponding to a virtualization packet, and add a first layer virtual local area network VLAN tag to the virtualization packet according to the virtual port corresponding to the virtualization packet, where the master node 11 has multiple virtual ports.

The master node 11 is further configured to send the virtualization packet to the egress AP 12 according to the first layer VLAN tag.

The egress AP 12 is configured to determine a remote network element port corresponding to the virtualization packet according to the first layer VLAN tag.

The egress AP 12 is further configured to: remove the first layer VLAN tag, and send the virtualization packet to a network device other than the virtual network element by using the remote network element port corresponding to the virtualization packet.

In this embodiment, the master node has multiple virtual ports, each virtual port of the master node is corresponding to one first layer VLAN tag, and each first layer VLAN tag is corresponding to one remote network element port.

Optionally, the virtual network element further includes at least one intermediate AP. The master node 11 is configured to send the virtualization packet to the intermediate AP according to the first layer VLAN tag; and the intermediate AP is configured to forward the virtualization packet to the egress AP 12 according to the first layer VLAN tag.

Optionally, the second layer tag is a distributed switching architecture DSA header, or the second layer tag is a second layer VLAN tag.

The virtual network element in this embodiment may be configured to perform the method in Embodiment 1. Specific implementations and technical effects are similar, and details are not described herein again.

Figure 8:
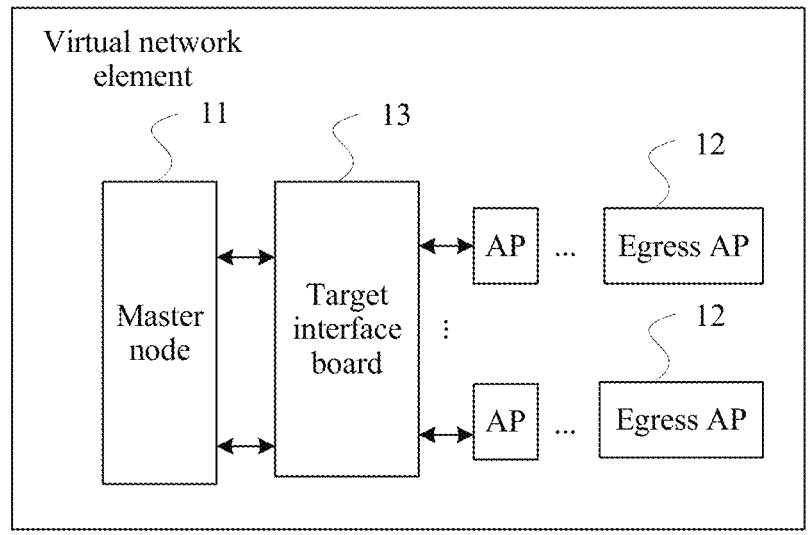
FIG. 8 is a schematic structural diagram of a virtual network element according to Embodiment 6 of the present disclosure.

FIG. 8 is a schematic structural diagram of a virtual network element according to Embodiment 6 of the present disclosure. The virtual network element provided by this embodiment further includes at least one interface board based on the structure of the virtual network element provided by Embodiment 5. Only one interface board is shown in FIG. 8, and certainly, more interface boards may be included in other embodiments. Based on Embodiment 5, the master node 11 in this embodiment is further configured to: add a second layer tag to the virtualization packet outside the first layer VLAN tag; and send the virtualization packet to a target interface board 13 in the at least one interface board according to the second layer tag.

The target interface board 13 is configured to determine a transmit port of the virtualization packet according to the second layer tag.

The target interface board 13 is further configured to: remove the second layer tag, and send the virtualization packet to the egress AP 12 by using the transmit port.

The virtual network element further includes at least one intermediate AP. The master node is configured to send the virtualization packet to the intermediate AP by using the transmit port; and the intermediate AP is configured to forward the virtualization packet to the egress AP 12 according to the first layer VLAN tag.

The virtual network element in this embodiment may be configured to perform the method in Embodiment 2. Specific implementations and technical effects are similar, and details are not described herein again.

Figure 9:
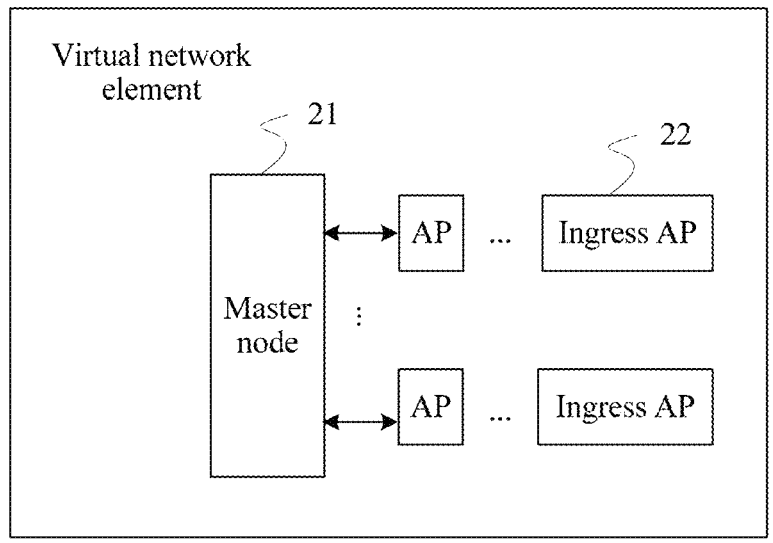
FIG. 9 is a schematic structural diagram of a virtual network element according to Embodiment 7 of the present disclosure.

Embodiment 7 of the present disclosure provides a virtual network element. FIG. 9 is a schematic structural diagram of the virtual network element according to Embodiment 7 of the present disclosure. The virtual network element includes: a master node 21 and an ingress AP 22, where the ingress AP 22 is a remote network element of the master node 21. For a structure of the virtual network element, refer to the virtual network element shown in FIG. 7.

The ingress AP 22 is configured to: receive a packet sent by a network device other than the virtual network element, and if the packet sent by the network device is a virtualization packet, add a first layer virtual local area network VLAN tag to the virtualization packet according to a corresponding remote network element port that receives the virtualization packet.

The ingress AP 22 is further configured to forward the virtualization packet to the master node 21 according to the first layer VLAN tag.

The master node 21 is configured to determine a virtual port corresponding to the virtualization packet according to the first layer VLAN tag.

The master node 21 is further configured to: remove the first layer VLAN tag, and forward the virtualization packet according to the virtual port corresponding to the virtualization packet.

The virtual network element further includes at least one intermediate AP. The master node is configured to send the virtualization packet to the intermediate AP according to the first layer VLAN tag; and the intermediate AP is configured to forward the virtualization packet to the master node according to the first layer VLAN tag.

In this embodiment, the master node has multiple virtual ports, each virtual port of the master node is corresponding to one first layer VLAN tag, and each first layer VLAN tag is corresponding to one remote network element port.

Optionally, the second layer tag is a distributed switching architecture DSA header, or the second layer tag is a second layer VLAN tag.

The virtual network element in this embodiment may be configured to perform the method in Embodiment 3. Specific implementations and technical effects are similar, and details are not described herein again.

Figure 10:
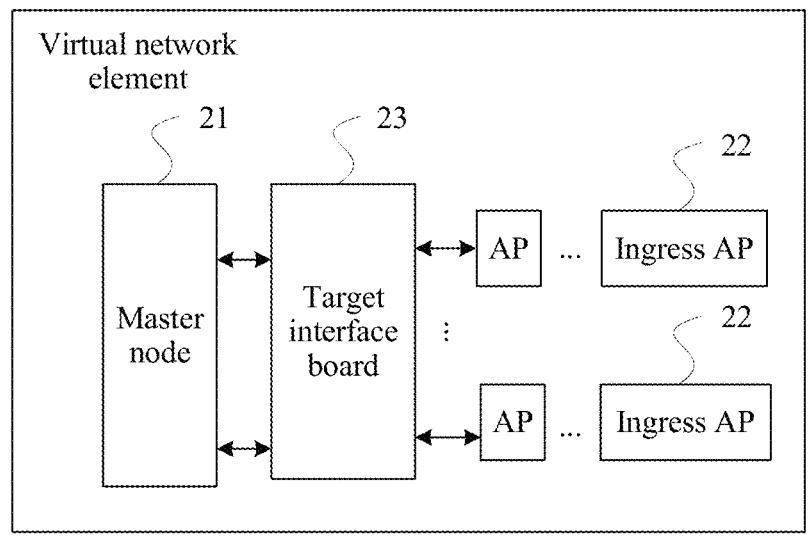
FIG. 10 is a schematic structural diagram of a virtual network element according to Embodiment 8 of the present disclosure.

Embodiment 8 of the present disclosure provides a virtual network element. FIG. 10 is a schematic structural diagram of the virtual network element according to Embodiment 8 of the present disclosure. The virtual network element provided by this embodiment further includes at least one interface board based on the structure of the virtual network element provided by Embodiment 7. Only one interface board is shown in FIG. 10, and certainly, more interface boards may be included in other embodiments. Based on Embodiment 7, the ingress AP 22 is further configured to forward the virtualization packet to a target interface board 23 in the at least one interface board according to the first layer VLAN tag.

The target interface board 23 is configured to add a second layer tag to the virtualization packet outside the first layer VLAN tag according to a receive port of the virtualization packet.

The target interface board 23 is further configured to forward the virtualization packet to the master node 21 according to the second layer tag.

The master node 21 is further configured to: determine, according to the second layer tag, that the received packet is a virtualization packet, and remove the second layer tag.

The virtual network element in this embodiment may be configured to perform the method in Embodiment 4. Specific implementations and technical effects are similar, and details are not described herein again.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for communicating by using a remote network element port, wherein the method is applied to a virtual network element, wherein the virtual network element comprises a master node and an egress access point (AP), wherein the egress AP is a remote network element of the master node, and the method comprises:
    determining, by the master node, a virtual port corresponding to a virtualization packet;
    adding, by the master node, a first layer virtual local area network (VLAN) tag to the virtualization packet according to the determined virtual port corresponding to the virtualization packet;
    sending, by the master node, the virtualization packet to the egress AP remote from the master node according to the first layer VLAN tag;
    determining, by the egress AP, a remote network element port corresponding to the virtualization packet according to the first layer VLAN tag;
    removing, by the egress AP, the first layer VLAN tag from the virtualization packet; and
    sending, by the egress AP after the removing, the virtualization packet to a network device other than the virtual network element by using the remote network element port corresponding to the virtualization packet.

2. The method according to claim 1, wherein the master node has multiple virtual ports, wherein each virtual port of the master node corresponds to one first layer VLAN tag, and wherein each first layer VLAN tag corresponds to one remote network element port.

3. The method according to claim 1, wherein the virtual network element further comprises at least one intermediate AP, and the sending, by the master node, the virtualization packet to the egress AP according to the first layer VLAN tag comprises:
sending, by the master node, the virtualization packet to the intermediate AP according to the first layer VLAN tag; and
forwarding, by the intermediate AP, the virtualization packet to the egress AP according to the first layer VLAN tag.

4. The method according to claim 1, wherein the virtual network element further comprises at least one interface board, and wherein after the adding the first layer VLAN tag to the virtualization packet according to the virtual port corresponding to the virtualization packet, the method further comprises:
adding, by the master node, a second layer tag to the virtualization packet outside the first layer VLAN tag; and
wherein the sending, by the master node, the virtualization packet to the egress AP according to the first layer VLAN tag comprises:
sending, by the master node, the virtualization packet to a target interface board in the at least one interface board according to the second layer tag;
determining, by the target interface board, a transmit port of the virtualization packet according to the second layer tag; and
removing, by the target interface board, the second layer tag, and sending the virtualization packet to the egress AP by using the transmit port.

5. The method according to claim 4, wherein the virtual network element further comprises at least one intermediate AP, and wherein the sending the virtualization packet to the egress AP by using the transmit port comprises:
sending, by the target interface board, the virtualization packet to the intermediate AP by using the transmit port; and
forwarding, by the intermediate AP, the virtualization packet to the egress AP according to the first layer VLAN tag.

6. The method according to claim 4, wherein the second layer tag is a distributed switching architecture (DSA) header.

7. The method according to claim 4, wherein the second layer tag is a second layer VLAN tag.

8. A network element, wherein the network element comprises a master node and an egress access point (AP), wherein the egress AP is a remote network element of the master node, and wherein:
the master node is configured to:
determine a virtual port corresponding to a virtualization packet;
add a first layer virtual local area network (VLAN) tag to the virtualization packet according to the determined virtual port corresponding to the virtualization packet; and
send the virtualization packet to the egress AP remote from the master node according to the first layer VLAN tag;
the egress AP is configured to:
determine a remote network element port corresponding to the virtualization packet according to the first layer VLAN tag;
remove the first layer VLAN tag from the virtualization packet; and
send, after removing the first layer VLAN tag from the virtualization packet, the virtualization packet to a network device other than the network element by using the remote network element port corresponding to the virtualization packet.

9. The network element according to claim 8, wherein the master node has multiple virtual ports, wherein each virtual port of the master node corresponds to one first layer VLAN tag, and wherein each first layer VLAN tag corresponds to one remote network element port.

10. The network element according to claim 8, wherein the network element further comprises at least one intermediate AP, wherein:
the master node is configured to send the virtualization packet to the intermediate AP according to the first layer VLAN tag; and
the intermediate AP is configured to forward the virtualization packet to the egress AP according to the first layer VLAN tag.

11. The network element according to claim 8, wherein the network element further comprises at least one interface board, and wherein:
the master node is further configured to:
add a second layer tag to the virtualization packet outside the first layer VLAN tag; and
send the virtualization packet to a target interface board in the at least one interface board according to the second layer tag; and
wherein the target interface board is configured to:
determine a transmit port of the virtualization packet according to the second layer tag;
remove the second layer tag; and
send the virtualization packet to the egress AP by using the transmit port.

12. The network element according to claim 11, wherein the network element further comprises at least one intermediate AP, wherein:
the master node is configured to send the virtualization packet to the intermediate AP by using the transmit port; and
the intermediate AP is configured to forward the virtualization packet to the egress AP according to the first layer VLAN tag.

13. The network element according to claim 11, wherein the second layer tag is a distributed switching architecture (DSA) header.

14. The network element according to claim 11, wherein the second layer tag is a second layer VLAN tag.

15. A network element, wherein the network element comprises a master node and an ingress access point (AP), and wherein the ingress AP is a remote network element of the master node, and wherein:
the ingress AP is configured to:
receive a packet sent by a network device other than the network element;
in response to a determination that the packet sent by the network device is a virtualization packet, add a first layer virtual local area network (VLAN) tag to the virtualization packet according to a corresponding remote network element port that receives the virtualization packet, wherein the ingress AP comprises at least one remote network element port, and wherein one remote network element port of the ingress AP corresponds to one first layer VLAN tag; and forward the virtualization packet to the master node remote from the ingress AP according to the first layer VLAN tag;

the master node is configured to:

determine a virtual port corresponding to the virtualization packet according to the first layer VLAN tag, wherein the master node has multiple virtual ports, and wherein one virtual port of the master node corresponds to one first layer VLAN tag;

remove the first layer VLAN tag from the virtualization packet; and after removing the first layer VLAN tag from the virtualization packet, forward the virtualization packet according to the virtual port corresponding to the virtualization packet.

16. The network element according to claim 15, wherein the master node has multiple virtual ports, wherein each virtual port of the master node corresponds to one first layer VLAN tag, and wherein each first layer VLAN tag corresponds to one remote network element port.

17. The network element according to claim 15, wherein the network element further comprises at least one intermediate AP, wherein:

the ingress AP is configured to send the virtualization packet to the intermediate AP according to the first layer VLAN tag; and the intermediate AP is configured to forward the virtualization packet to the master node according to the first layer VLAN tag.

18. The network element according to claim 15, wherein the network element further comprises at least one interface board, and wherein the ingress AP is further configured to forward the virtualization packet to a target interface board in the at least one interface board according to the first layer VLAN tag;

wherein the target interface board is configured to:

add a second layer tag to the virtualization packet outside the first layer VLAN tag according to a receive port of the virtualization packet; and forward the virtualization packet to the master node according to the second layer tag; and wherein the master node is further configured to:

determine, according to the second layer tag, that the received packet is a virtualization packet; and remove the second layer tag from the virtualization packet.

19. The network element according to claim 18, wherein the second layer tag is a distributed switching architecture (DSA) header.

20. The network element according to claim 18, wherein the second layer tag is a second layer VLAN tag.

* * * * *